United States Patent [19]
Li

[11] Patent Number: 5,880,840
[45] Date of Patent: *Mar. 9, 1999

[54] ALUMINA RECESSION DETERMINATION USING A FLYING HEIGHT TESTER

[75] Inventor: Yufeng Li, Freemont, Calif.

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 717,847

[22] Filed: Sep. 23, 1996

[51] Int. Cl.$^6$ ....................................................... G01B 9/02
[52] U.S. Cl. ........................................... 356/357; 356/345
[58] Field of Search ................................... 356/357, 359, 356/360, 345

[56] References Cited

U.S. PATENT DOCUMENTS 4,813,782  3/1989  Yagi et al. ............................... 356/357

OTHER PUBLICATIONS

Bharat Bhudhan, Tribology and Mechanics of Magnetic Storage Devices, pp. 765–797, 1990.

Tanaka et al, Measurements of Transient Motion of Magnetic Disk Slider, IEEE Transactions on Magnetics, vol. MAG–20, No. 5, Sep. 1984.

Primary Examiner—Robert Kim
Attorney, Agent, or Firm—Blakely Sokoloff Taylor & Zafman

[57] ABSTRACT

A method for measuring a surface recession of a magnetic recording head using a flying height tester. The recording head has a trailing edge portion that extends from an air bearing surface. The trailing edge portion contains the read/write elements of the recording head. Manufacturing processes typically create a recession in the trailing edge portion. The recession is measured by placing the slider adjacent to a rotating transparent substrate of a flying height tester. A light beam is then directed through the substrate and reflected off of the slider. The reflected light beam is detected to compute a flying height between the substrate and the point of reflection on the slider. The light beam is reflected off various points on the air bearing surface and the trailing edge portion to measure a number of different flying heights. The various flying heights are then used to compute the recession in the slider.

6 Claims, 1 Drawing Sheet

U.S. Patent Mar. 9, 1999 5,880,840

ALUMINA RECESSION DETERMINATION USING A FLYING HEIGHT TESTER

BACKGROUND OF THE INVENTION

1. FIELD OF THE INVENTION

The present invention relates to a method for measuring a surface recession of a magnetic recording head with a flying height tester.

2. DESCRIPTION OF RELATED ART

Hard disk drives contain magnetic transducers that magnetize and sense the magnetic field of a rotating disk. The transducers are integrated into sliders that are assembled to a head gimbal assembly (HGA). The sliders contain hydrodynamic features that create an air bearing between the slider and the rotating disk. The air bearing prevents mechanical wear between the disk surface and the slider.

The height of the air bearing is a critical parameter that can affect the life and performance of the entire disk drive. Therefore it is desirable to measure that height of the air bearing before installing the HGA into a disk drive assembly. The air bearing height can be measured with an apparatus commonly referred to as a flying height tester (FHT). A FHT contains a loader which places the slider adjacent to a rotating transparent substrate. The slider is separated from the rotating substrate by an air bearing. A light beam is directed through the substrate and reflected-off of the slider. The reflected light beam creates an interference pattern that is detected by a-detector. A computer then computes the height of the air bearing from the detected interference pattern.

FIG. 1 shows a slider 1 of the prior art. The slider 1 has an air bearing surface (ABS) 2 that is typically constructed from an $Al_2O_3$-TiC material. Extending from the air bearing surface 2 is a trailing edge 3 that contains the read/write elements 4 of the slider 1. The read/write elements 4 are typically embedded within a layer of $Al_2O_3$ that is subsequently removed with a lapping process. The lapping process may create a recession ha between the air bearing surface 2 and the trailing edge 3.

To more accurately determine the reliability of a slider it is desirable to measure the minimum air bearing height between the slider and the substrate. Flying height testers typically measure the air bearing A height between the air bearing surface 2 and the substrate. Because of the recession and the angular pitch of the flying slider the measured air bearing height may not be the minimum air bearing height. Present flying height tester techniques therefore do not provide the actual minimum air bearing height between a slider and a substrate. Additionally, the true minimum air bearing height cannot be calculated because the depth of the recession may vary from slider to slider.

The actual depth of the recession may be meaured with a stylus or optical profilometer and then used to calculate the minimum air bearing height. The stylus profilometer utilizes a mechanical probe to measure the surface profile of the slider. The mechanical probe may cause undesirable material deformation when dragged across the slider surface. The profilometers also require additional equipment and test stations which add to the cost of testing and producing hard disk drives. It would be desirable to provide a technique to measure the surface recession of a magnetic recording head with an existing flying height tester.

SUMMARY OF THE INVENTION

The present invention is a method for measuring a surface recession of a magnetic recording head using a flying height tester. The recording head has a trailing edge portion that extends from an air bearing surface The trailing edge portion contains the read/write elements of the recording head. Manufacturing processes typically create a recession in the trailing edge portion. The recession is measured by placing the slider adjacent to a rotating transparent substrate of a flying height tester. A light beam is then directed through the substrate and reflected off of the slider. The reflected light beam is detected to compute a flying height between the substrate and the point of reflection on the slider. The light beam is reflected off various points on the air bearing surface and the trailing edge portion to measure a number of different flying heights. The various flying heights are then used-to compute the recession in the slider.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
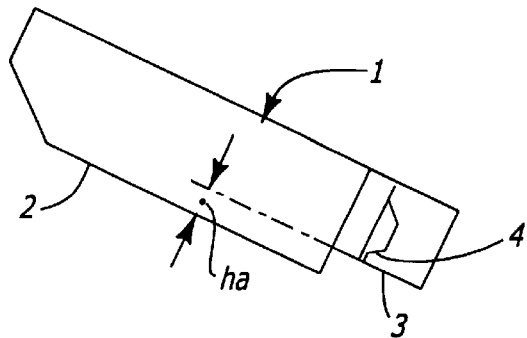
FIG. 1 is a schematic of a slider/substrate interface of the prior art.
Figure 2:
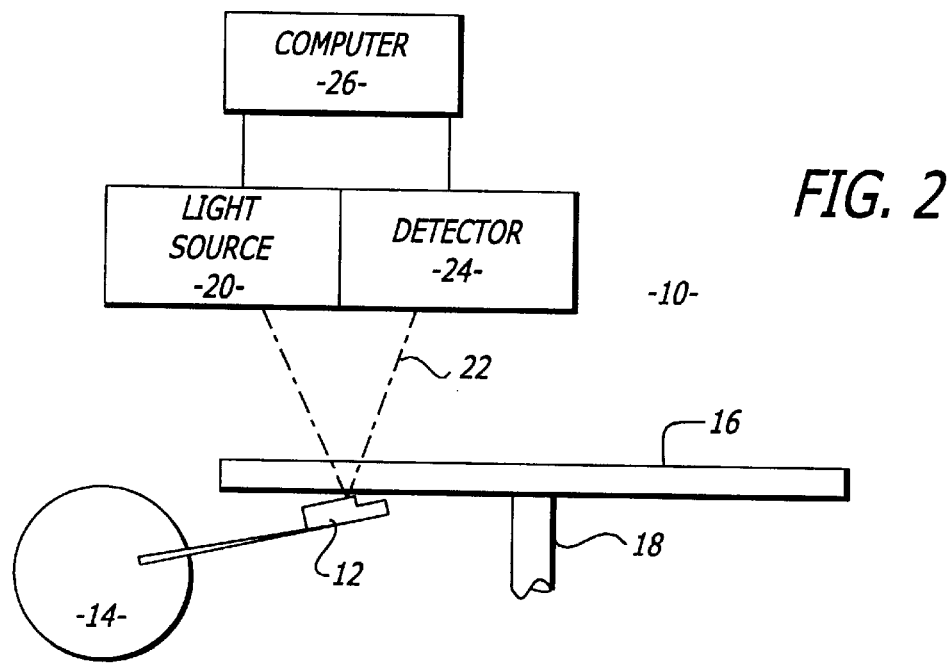
FIG. 2 is a schematic of a flying height tester of the present invention.

Referring to the drawings more particularly by reference numbers, FIG. 2 shows an apparatus 10 used to perform the measurement technique of the present invention. The apparatus 10 is commonly referred to as a flying height tester (FHT). A flying height tester can measure the height of a space that separates a slider 12 from a reference plane.

The flying height tester 10 includes a loader 14 which places the slider 12 adjacent to a transparent substrate 16. The substrate 16 is rotated by a spindle 18. The FHT 10 further has a light source 20 which directs a light beam 22 through the substrate 16 and onto the slider 12. The light reflects off of the slider 12 and back through the substrate 16. Part of the light also reflects off of the substrate 16 so that the reflected light creates an interference pattern.

The reflected light is detected by a detector 24. The detector 24 is coupled to a computer 26 which can compute the height of the air bearing that separates the substrate 16 from the point of reflection on the slider 12. The light source 20 and detector 24 may be coupled to a mechanical gantry (not shown) which moves the light beam 22 to different locations on the slider 12. Although a gantry is described, it is to be undestood that other means for moving the light beam 22 may be employed. For example, the substrate 16 and slider 12 may be coupled to an x-y table that moves the slider 12 relative to the light beam, or the system may have mirrors that are actuated to redirect the light 22.

Figure 3:
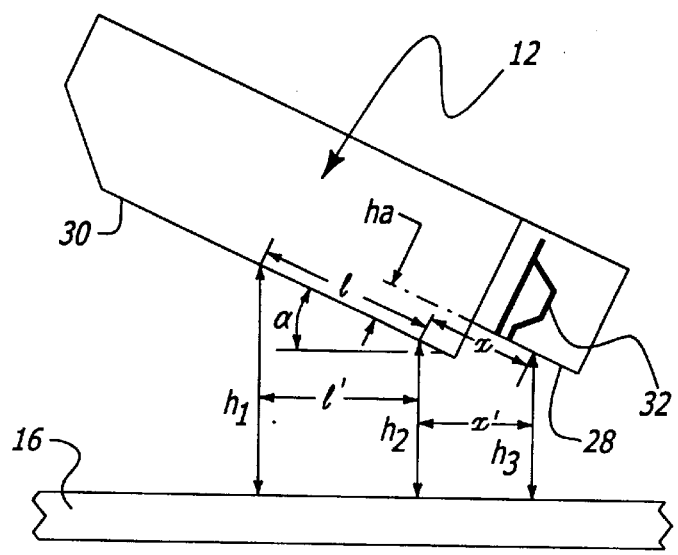
FIG. 3 is a schematic of a slider/substrate interface.

FIG. 3 shows a profile of a conventional slider 12. The slider 12 has a trailing edge portion 28 that extends from an air bearing surface 30. The trailing edge portion 28 contains the read/write elements 32 of the slider 12. Because of manufacturing processes the trailing edge portion 28 may be recessed from the air bearing surface 30 by a recession ha. The slider 12 also typically flies above the substrate 16 at a pitch angle α.

The flying height tester 10 can compute the recession ha from various flying height measurments taken at different points on the slider 12. In the preferred embodiment, the flying height tester 10 moves the light beam so that the light reflects off of a first point located on the air bearing surface 30 of the slider 12. The flying height tester then computes a first flying height hi that separates the substrate 16 from the first point on the slider. The flying height tester 10 then moves the light beam a distance l' so that the light is reflected off of a second point on the air bearing surface 30 of the slider 12. The FHT 10 then computes a second flying height $h_2$ that separates the substrate 16 from the second point on the slider 12. The pitch angle $\alpha$ can be computed by the computer 26 from the equation:

$$\alpha = \sin^{-1}\left(\frac{h_1 - h_2}{l}\right)$$

Where l can be computed from the equation $$l = \sqrt{(h_1 - h_2)^2 + (l')^2}$$

The flying height tester 10 moves the light beam a distance x' so that the light is reflected off of a third point located on the trailing edge portion 28 of the slider 12. The flying height tester 10 computes a third flying height h3 that separates the substrate 16 from the third point on the slider 12. The recession $h_a$ can be computed by the computer 26 from the equation:

$$h_a = (h_3 - h_2 + x' \tan \alpha) \cos \alpha$$

The angle $\alpha$ is relatively small so that cos $\alpha$ can be approximated as one.

The technique of the present invention thus allows the trailing edge recession of a slider to be measured using a flying height tester. The recession can be used to calculate the true minimum air bearing height of the slider 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although the technique of the present invention is described as measuring three flying heights $h_1$, $h_2$ and $h_3$, it is to be understood that the recession $h_a$ may be computed with a different number of flying height measurements.

What is claimed is:

1. A method for measuring a surface recession in a tailing edge portion of a recording head, the recording head having a read element in the trailing edge portion and an air bearing surface that is separate from the trailing edge portion, the surface recession has a depth ha measured from the air bearing surface, comprising the steps of:

a) placing the recording head adjacent to a rotating transparent substrate;

b) directing a light beam through the transparent substrate so that the light beam is reflected from the air bearing surface of the recording head;

c) detecting the light beam reflected from the air bearing surface;

d) directing the light beam through the transparent substrate so that the light beam is reflected from the surface recession of the recording head;

e) detecting the light beam reflected from surface recession; and, f) computing the depth $h_a$ of the surface recession from the reflected light beams detected in steps (c) and (e).

2. The method as recited in claim 1, wherein the light beam is reflected from a first point and a second point on the air bearing surface of the recording head and a third point on the surface recession of the recording head, and a first height is measured between the first point and the transparent substrate, a second height is measured between the second point and the transparent substrate, and a third height is measured between the third point and the transparent substrate, wherein the surface recession is computed from the first, second and third heights.

3. The method as recited in claim 2, wherein the recording head is located at a pitch angle relative to the transparent substrate, and the pitch angle is computed from the first height and the second height, and then used to calculate the surface recession.

4. A system for measuring a surface recession in a trailing edge portion of recording head, the recording head having a read element in the trailing edge portion and an air bearing surface that is separate from the trailing edge portion, the surface recession has a depth $h_a$ measured from the air bearing surface, comprising:

a transparent substrate that rotates adjacent to the recording head;

a light source that directs a light beam through the transparent substrate so that the light beam is reflected from the air bearing surface and the surface recession of the recording head;

a detector that detects the light beam reflected from the air bearing surface and the surface recession; and, a computer that determines the depth $h_a$ of the surface recession from the detected light beams reflected from the air bearing surface and the surface recession.

5. The system as recited in claim 4, wherein the light beam is reflected from a first point and a second point on the air bearing surface of the recording head and a third point on the surface recession of the recording head, and said computer computes a first height between the first point and the transparent substrate, a second height between the second point and the transparent substrate, and a third height between the third point and the transparent substrate, wherein the surface recession is computed from the first, second and third heights.

6. The system as recited in claim 5, wherein the recording head is located at a pitch angle relative to the transparent substrate, and the pitch angle is computed from the first height and the second height, and then used to calculate the surface recession.

* * * * *